(12) United States Patent
Nakamura et al.

(10) Patent No.: US 9,341,708 B2
(45) Date of Patent: May 17, 2016

(54) ROAD SURFACE CONDITION DETECTION DEVICE AND ROAD SURFACE CONDITION DETECTION METHOD

(71) Applicant: NISSAN MOTOR CO., LTD., Yokohama-shi, Kanagawa (JP)

(72) Inventors: Mitsunori Nakamura, Tokyo (JP); Hiroshi Satoh, Yokohama (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/419,758

(22) PCT Filed: Aug. 1, 2013

(86) PCT No.: PCT/JP2013/070847
§ 371 (c)(1),
(2) Date: Feb. 5, 2015

(87) PCT Pub. No.: WO2014/024763
PCT Pub. Date: Feb. 13, 2014

(65) Prior Publication Data
US 2015/0212199 A1 Jul. 30, 2015

(30) Foreign Application Priority Data
Aug. 8, 2012 (JP) ................. 2012-175865

(51) Int. Cl.
*G01S 13/93* (2006.01)
*G01S 7/41* (2006.01)
(Continued)

(52) U.S. Cl.
CPC .............. *G01S 7/411* (2013.01); *G01S 7/024* (2013.01); *G01S 13/89* (2013.01); *G01W 1/00* (2013.01);
(Continued)

(58) Field of Classification Search
CPC .................. G01S 7/411; G01S 7/024
USPC ................... 342/70, 118, 188; 340/580
See application file for complete search history.

(56) References Cited

U.S. PATENT DOCUMENTS 6,630,901 B1 * 10/2003 Winter ............ H01Q 1/02
342/175
7,167,126 B2 * 1/2007 Wittenberg .......... G01S 13/426
342/123
(Continued)

FOREIGN PATENT DOCUMENTS

JP 2004-177188 A 6/2004
JP 2007-140992 A 6/2007

OTHER PUBLICATIONS

Yamada, M.; Ueda, K.; Horiba, I.; Sugie, N., "Discrimination of the road condition toward understanding of vehicle driving environments," in Intelligent Transportation Systems, IEEE Transactions on , vol. 2, No. 1, pp. 26-31, Mar. 2001.*

*Primary Examiner* — John B Sotomayor
*Assistant Examiner* — Marcus Windrich
(74) *Attorney, Agent, or Firm* — Young Basile Hanlon & MacFarlane P.C.

(57) ABSTRACT

A radio waves receiving unit receives horizontally polarized waves and vertically polarized waves of radio waves radiated from an object at a radiation angle. An image generation unit generates a horizontally polarized waves image and a vertically polarized waves image based on the horizontally polarized waves and the vertically polarized waves, respectively. A polarization ratio calculation unit calculates, for each radiation angle, a polarization ratio which is a ratio of intensity of the horizontally polarized waves to the vertically polarized waves based on the horizontally polarized waves image and the vertically polarized waves image. A refractive index calculation unit calculates a refractive index of the object based on a change between polarization ratios of two different radiation angles. A road surface condition recognition unit recognizes a condition of a road surface based on the refractive index.

9 Claims, 4 Drawing Sheets

(51) Int. Cl.
*G01W 1/00* (2006.01)
*G06K 9/00* (2006.01)
*G01W 1/14* (2006.01)
*G01S 7/02* (2006.01)
*G01S 13/89* (2006.01)
*G01S 13/86* (2006.01)

(52) U.S. Cl.
CPC ............. *G01W 1/14* (2013.01); *G06K 9/00791* (2013.01); *G01S 13/86* (2013.01); *G01S 2013/9353* (2013.01)

(56) References Cited

U.S. PATENT DOCUMENTS

| | | | |
|---|---|---|---|
| 7,688,258 B2* | 3/2010 | Aoki | G01S 13/89 342/179 |
| 9,081,086 B2* | 7/2015 | Nakamura | G08G 1/166 |
| 2010/0299063 A1* | 11/2010 | Nakamura | G06K 9/00798 701/532 |
| 2015/0014533 A1* | 1/2015 | Nakamura | G08G 1/166 250/336.1 |

* cited by examiner

| | REFRACTIVE INDEX |
|---|---|
| SNOW | 1.2 |
| DRY | 2 |
| ICE | 2.5 |
| WET | 5.4 |

ROAD SURFACE CONDITION DETECTION DEVICE AND ROAD SURFACE CONDITION DETECTION METHOD

CROSS REFERENCE TO RELATED APPLICATION

The present application claims priority to Japanese Patent Application No. 2012-175865, filed Aug. 8, 2012, incorporated herein in its entirety.

TECHNICAL FIELD

The present invention relates to road surface condition detection devices and road surface condition detection methods for detecting road surface conditions.

BACKGROUND

There is known a device for detecting road surface conditions, wherein the device measures a radiation temperature of a road surface and a radiation temperature of the sky so as to recognize the condition of the road surface according to a reception intensity ratio of a horizontally polarized wave component to a vertically polarized wave component on the basis of the sky (refer to Japanese Unexamined Patent Application Publication No. 2004-177188).

SUMMARY

However, the device described in Japanese Unexamined Patent Application Publication No. 2004-177188 that detects the condition of the road surface based on the radiation temperature of the sky, is difficult to be applied to vehicles because the baseline of temperature is not stabilized when the weather is unsettled.

An object of the present invention is to provide a road surface condition detection device and a road surface condition detection method capable of detecting road surface conditions with high accuracy regardless of weather.

A road surface condition detection device according to a first aspect of the present invention includes a radio waves receiving unit, an image generation unit, a polarization ratio calculation unit, a refractive index calculation unit, and a road surface condition recognition unit. The radio waves receiving unit receives horizontally polarized waves and vertically polarized waves of radio waves radiated from an object at a radiation angle. The image generation unit generates a horizontally polarized waves image and a vertically polarized waves image based on the horizontally polarized waves and the vertically polarized waves, respectively, received by the radio waves receiving unit. The polarization ratio calculation unit calculates, for each radiation angle, a polarization ratio which is a ratio of intensity of the horizontally polarized waves to the vertically polarized waves based on the horizontally polarized waves image and the vertically polarized waves image generated by the image generation unit. The refractive index calculation unit calculates a refractive index of the object according to a change between polarization ratios of two different radiation angles calculated by the polarization ratio calculation unit. The road surface condition recognition unit recognizes a condition of a road surface based on the refractive index calculated by the refractive index calculation unit.

A road surface condition detection method according to a second aspect of the present invention includes: receiving horizontally polarized waves and vertically polarized waves of radio waves radiated from an object at a radiation angle; generating a horizontally polarized waves image and a vertically polarized waves image based on the received horizontally polarized waves and vertically polarized waves, respectively; calculating, for each radiation angle, a polarization ratio which is a ratio of intensity of the horizontally polarized waves to the vertically polarized waves based on the generated horizontally polarized waves image and vertically polarized waves image; calculating a refractive index of the object according to a change between calculated polarization ratios of two different radiation angles; and recognizing a condition of a road surface based on the calculated refractive index.

DESCRIPTION OF EMBODIMENTS

Figure 1:
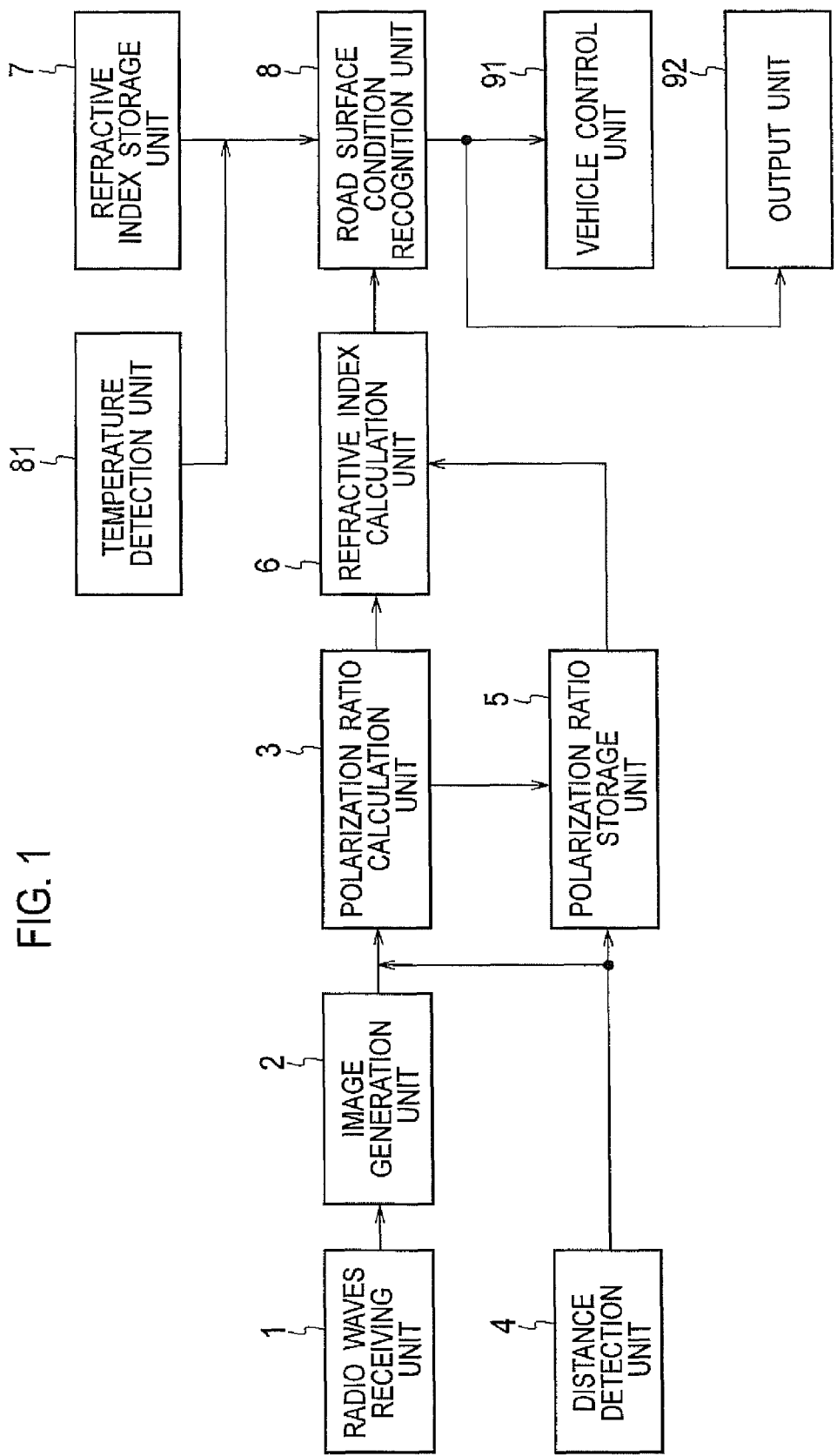
FIG. 1 is a schematic block diagram for explaining a basic configuration of a road surface condition detection device according to an embodiment of the present invention.

Hereinafter, an embodiment of the present invention will be explained with reference to the drawings. In the following explanations of the drawings, the same or similar elements are indicated by the same or similar reference numerals. It should be noted that the embodiment described below exemplifies a device and a method to materialize the technical idea of the present invention but is not limited to the device and the method exemplified in the embodiment. The technical idea of the present invention may be subjected to various modifications within the scope of claims.

As shown in FIG. 1, a road surface condition detection device according to the embodiment of the present invention includes a radio waves receiving unit 1, an image generation unit 2, a polarization ratio calculation unit 3, a distance detection unit 4, a polarization ratio storage unit 5, a refractive index calculation unit 6, a refractive index storage unit 7, and a road surface condition recognition unit 8. The road surface condition detection device according to the embodiment of the present invention is installed in a vehicle to detect road surface conditions in front of the vehicle.

The radio waves receiving unit 1 receives horizontally polarized waves and vertically polarized waves of radio waves radiated from an object which is, for example, a road surface in front of the vehicle at a radiation angle θ (an angle between a radiation direction from an object to the radio waves receiving unit 1 and a vertical direction). The radio waves receiving unit 1 includes, for example, an array antenna in which a plurality of antennas are arrayed. The radio waves receiving unit 1 has an angle of view of, for example, approximately 15° in the vertical direction and approximately 30° in the horizontal direction. Here, "radio waves" in the present invention is electromagnetic waves having a frequency approximately in the range from 30 GHz to 10 THz.

The image generation unit 2 generates a horizontally polarized image and a vertically polarized image based on the horizontally polarized waves and the vertically polarized waves of the radio waves, respectively, received by the radio waves receiving unit 1. The horizontally polarized image is a two-dimensional image based on a horizontally polarized waves component of the radio waves received by the radio waves receiving unit 1, and the vertically polarized waves image is a two-dimensional image based on a vertically polarized waves component of the radio waves received by the radio waves receiving unit 1.

The polarization ratio calculation unit 3 calculates a polarization ratio $P_H/P_V$, which is a ratio of intensity (received power) of the horizontally polarized waves component to the vertically polarized waves component of the radio waves received by the radio waves receiving unit 1, based on the horizontally polarized waves image and the vertically polarized waves image generated by the image generation unit 2.

Figure 2:
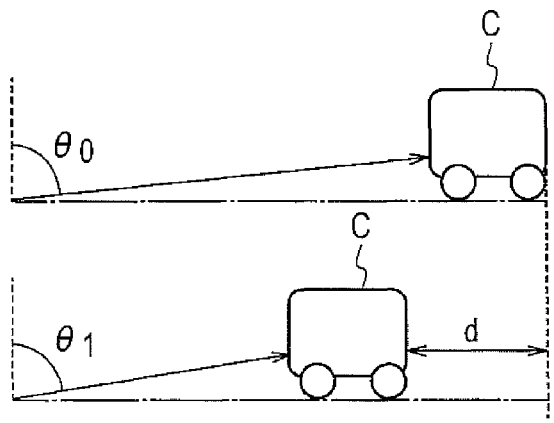
FIG. 2 is a schematic view for explaining an operation of a polarization ratio calculation unit included in the road surface condition detection device according to the embodiment of the present invention.

The distance detection unit 4 detects a travel distance d of the vehicle C equipped with the road surface condition detection device according to the embodiment of the present invention. As shown in FIG. 2, the polarization ratio calculation unit 3 calculates a radiation angle θ of radio waves radiated from an object according to the travel distance d detected by the distance detection unit 4. In the example shown in FIG. 2, when the radiation angle of the radio waves from the particular object in the initial state of the vehicle C is conceived to be $\theta_0$, the radiation angle after the vehicle C moves by the distance $\Delta d$ is $\theta_1$.

The polarization ratio calculation unit 3 calculates the polarization ratio $P_H/P_V$ for each radiation angle θ. The polarization ratio storage unit 5 stores, for each radiation angle θ, the polarization ratio $P_H/P_V$ calculated by the polarization ratio calculation unit 3.

The refractive index calculation unit 6 calculates a prediction refractive index n of the object based on the polarization ratio $P_H/P_V$ for each radiation angle θ calculated by the polarization ratio calculation unit 3. The refractive index calculation unit 6 first calculates a ratio $\Gamma(\theta_0, \theta_1)$ as a change between the polarization ratios $P_H/P_V$ with regard to two radiation angles $\theta_0$ and $\theta_1$, as shown in the following formula (1).

$$\Gamma(\theta_0, \theta_1) = \frac{P_H(\theta_1)/P_V(\theta_1)}{P_H(\theta_0)/P_V(\theta_0)} \quad (1)$$

The refractive index calculation unit 6 then calculates the prediction refractive index n of the object according to the calculated ratio $\Gamma(\theta_0, \theta_1)$ with reference to Fresnel equations, as shown in the following formula (2).

$$\frac{\{n\cos\theta_0 - \cos(\sin^{-1}(\frac{1}{n}\sin\theta_0))\}}{\{n\cos\theta_1 + \cos(\sin^{-1}(\frac{1}{n}\sin\theta_1))\}} = \Gamma(\theta_0, \theta_1) \quad (2)$$
$$\frac{\{n\cos\theta_0 + \cos(\sin^{-1}(\frac{1}{n}\sin\theta_0))\}}{\{n\cos\theta_1 - \cos(\sin^{-1}(\frac{1}{n}\sin\theta_1))\}}$$

Figure 3:
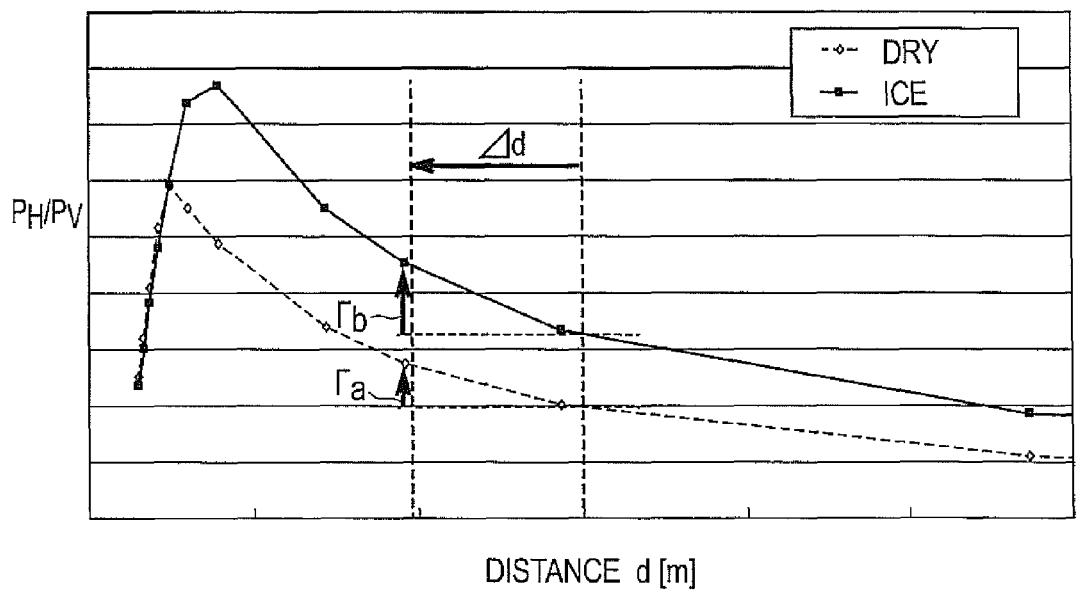
FIG. 3 is a view for explaining a polarization ratio for each road surface condition used in the road surface condition detection device according to the embodiment of the present invention.

For example, as shown in FIG. 3, the polarization ratio calculation unit 3 calculates the polarization ratio $P_H/P_V$ of the horizontally polarized waves component to the vertically polarized waves component per travel distance d when the object is a dry road surface (each data for the dry road surface is indicated by a white rhombus "◇"). Similarly, the polarization ratio calculation unit 3 calculates the polarization ratio $P_H/P_V$ of the horizontally polarized waves component to the vertically polarized waves component per travel distance d when the object is an ice road surface (each data for the ice road surface is indicated by a black square "■").

Figures 4, 5:
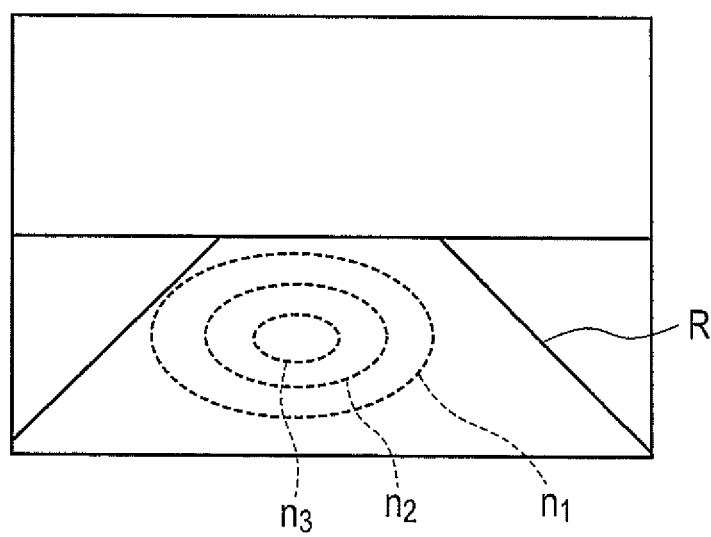
FIG. 4 is an example of refractive index information used in the road surface condition detection device according to the embodiment of the present invention.
FIG. 5 is a schematic view for explaining a road surface condition recognition unit included in the road surface condition detection device according to the embodiment of the present invention.

As shown in FIG. 4, the refractive index storage unit 7 stores refractive index information including items of road surface conditions in relation to refractive indexes. In the example shown in FIG. 4, the refractive index storage unit 7 stores the information that the refractive index is 1.2 when the road surface condition is "snow" and stores the information that the refractive index is 2 when the road surface condition is "dry". Here, the refractive index storage unit 7 may store ranges of values as refractive indexes. The refractive index information further includes other road surface conditions of "ice" and "wet".

The road surface recognition unit 8 refers to the refractive index information stored in the refractive index storage unit 7 so as to recognize the condition of the road surface based on the refractive index of the object calculated by the refractive index calculation unit 6.

In the example shown in FIG. 4, the refractive index calculation unit 6 is conceived to calculate the refractive index n to be 2 according to a ratio $\Gamma_a$ of the polarization ratios $P_H/P_V$ of the two radiation angles $\theta_0$ and $\theta_1$ when the vehicle C moves by the distance Δd on the dry road surface. Then, the road surface condition recognition unit 8 searches the refractive index information stored in the refractive index storage unit 7 for a refractive index closest to the calculated refractive index, and recognizes the condition of the road surface where the vehicle is driving to be a road surface condition corresponding to the searched refractive index. Namely, the road surface condition recognition unit 8 recognizes the condition of the road surface where the vehicle C is driving to be "dry".

Similarly, the refractive index calculation unit 6 calculates the refractive index n to be 3 according to a ratio $\Gamma_b$ of the polarization ratios $P_H/P_V$ of the two radiation angles $\theta_0$ and $\theta_1$ when the vehicle C moves by the distance Δd on the ice road surface. Then, the road surface condition recognition unit 8 searches the refractive index information stored in the refractive index storage unit 7 for a refractive index closest to the calculated refractive index, which is 2.5, and recognizes the condition of the road surface where the vehicle is driving to be a road surface condition corresponding to the searched refractive index which is "ice".

The road surface condition recognition unit 8 may obtain an ambient temperature from a temperature detection unit 81 for detecting an ambient temperature and exclude road surface conditions to be recognized depending on the obtained ambient temperature at the time of the recognition of the road surface condition. For example, when the road surface temperature is 3° C. or lower, the possibility that the road surface condition is "ice" or "snow" is low. For example, when a threshold value is set to 5° C., and when the ambient temperature is 5° C. or higher, the road surface condition recognition unit 8 recognizes the road surface condition while excluding the condition "ice" or "snow" from the road surface conditions included in the refractive index information.

The road surface condition recognition unit 8 includes a road surface region detection unit for detecting a road surface region corresponding to the road surface in the images generated by the image generation unit 2. For example, the road surface region detection unit detects the road surface region based on the polarization ratio of the horizontally polarized waves to the vertically polarized waves received by the radio waves receiving unit 1. Here, received power of radio waves radiated from a flat object such as a road surface has a characteristic that the change thereof is stabilized within a particular range. Thus, the road surface region detection unit may, for example, extract a region in which the change of the received power of the radio waves received by the radio waves receiving unit 1 is within a prescribed value (for example, 5%) in the images generated by the image generation unit 2 so as to detect the extracted region as a road surface region.

In addition, the road surface condition recognition unit 8 may determine two regions not overlapping each other in the detected road surface region for the two radiation angles $\theta_0$ and $\theta_1$ for which each polarization ratio $P_H/P_V$ is calculated, so as to obtain a refractive index according to the degrees of intensity of the two determined regions. For example, the road surface condition recognition unit 8 obtains intensity $P_H$ ($\theta_{w1}$) of the horizontally polarized waves for one of the two determined regions and intensity $P_V$ ($\theta_{w0}$) of the vertically polarized waves for the other region, calculates a ratio $\Gamma(\theta_{w1}, \theta_{w0})$ from the average value of $P_H(\theta_{w1})$ and $P_V(\theta_{w0})$, and calculates the refractive index n from the calculated $\Gamma(\theta_{w1}, \theta_{w0})$.

In addition, the road surface condition recognition unit 8 may output, to a vehicle control unit 91 for controlling the operation of the vehicle C, a control signal for commanding the vehicle control unit 91 to control the operation of the vehicle C. For example, as shown in FIG. 5, the road surface condition recognition unit 8 determines boundaries where the refractive index n changes to $n_1$, $n_2$ and $n_3$ in the images generated by the image generation unit 2, and controls the operation of the vehicle C via the vehicle control unit 91 depending on a distance to an actual position corresponding to the respective determined boundaries. The boundary corresponding to the refractive index n may be determined by spatially analyzing the polarization ratios $P_H/P_V$ for the respective radiation angles $\theta_0$ and $\theta_1$ based on a region where points of reflection coincide with each other.

The vehicle control unit 91 includes, for example, a drive unit for driving the vehicle, a braking unit for decelerating or stopping the vehicle, a steering unit for changing traveling directions of the vehicle, and the like.

In addition, the road surface condition recognition unit 8 may determine the boundary corresponding to the refractive index n in the images generated by the image generation unit 2 and provide a passenger with sounds, letters or images via an output unit 92 according to the distance to the actual position corresponding to the determined boundary. The output unit 92 includes a speaker, a display unit, and the like. Further, the road surface condition recognition unit 8 may gradually change the output of the output unit 92 according to the distance to the actual position corresponding to the determined boundary.

Figure 6:
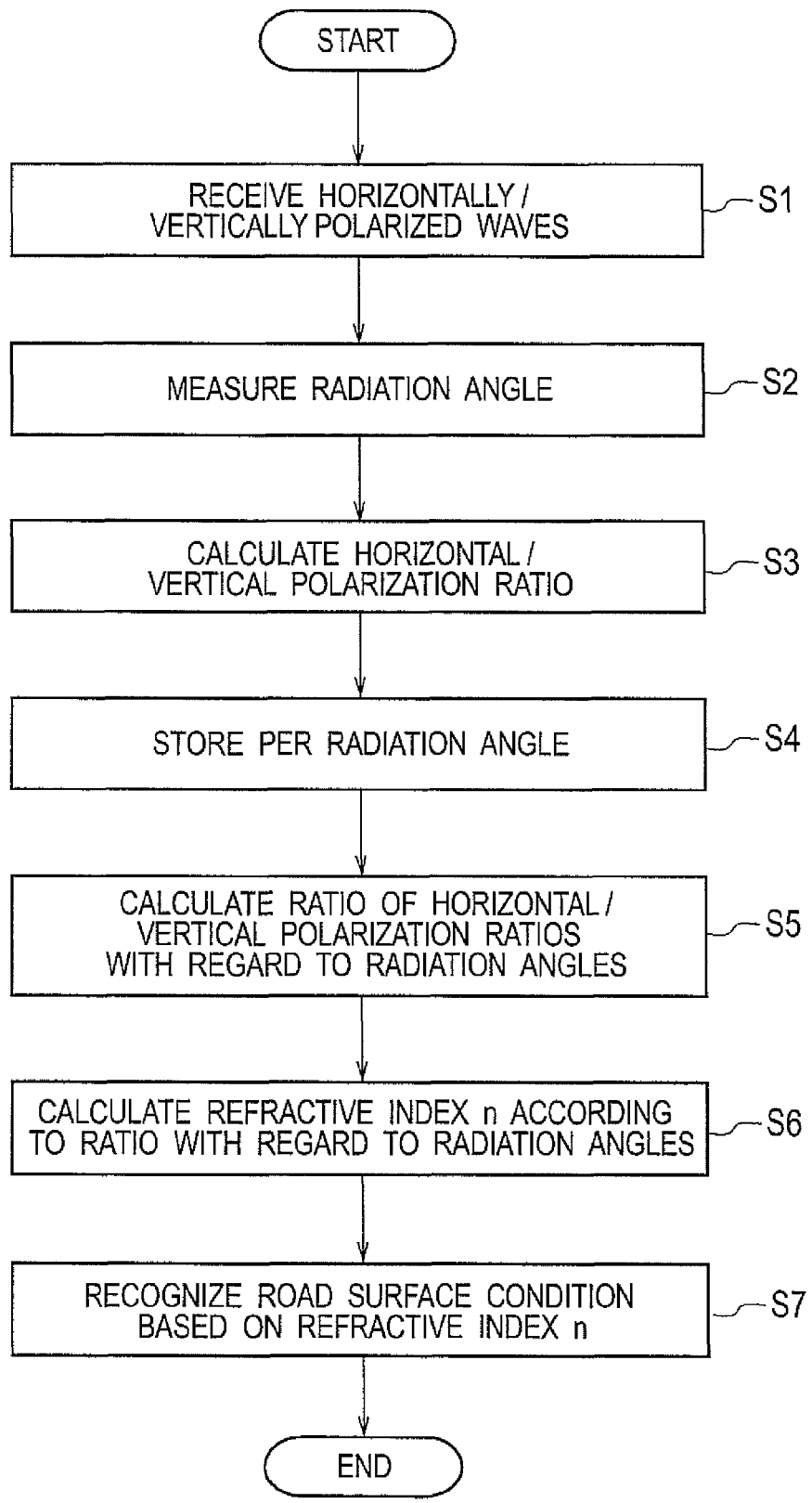
FIG. 6 is a flow chart for explaining a road surface condition detection method according to the embodiment of the present invention.

An example of a road surface condition detection method in the road surface condition detection device according to the embodiment of the present invention is explained below with reference to the flow chart of FIG. 6. In the following explanation, the road surface condition detection device according to the embodiment of the present invention is a device installed in a vehicle to detect road surface conditions in a traveling direction of the vehicle.

First, in step S1, the radio waves receiving unit 1 receives horizontally polarized waves and vertically polarized waves of radio waves radiated from an object in front of the vehicle. Next, the image generation unit 2 generates a horizontally polarized waves image and a vertically polarized waves image based on the horizontally polarized waves and the vertically polarized waves of the radio waves, respectively, received by the radio waves receiving unit 1.

In step S2, the polarization ratio calculation unit 3 calculates a radiation angle $\theta$ of the radio waves radiated from the object according to the horizontally polarized waves image and the vertically polarized waves image generated by the image generation unit 2 and a travel distance d of the vehicle detected by the distance detection unit 4.

In step S3, the polarization ratio calculation unit 3 calculates a polarization ratio $P_H/P_V$, which is a ratio of intensity (received power) of a horizontally polarized waves component to a vertically polarized waves component of the radio waves received by the radio waves receiving unit 1, based on the horizontally polarized waves image and the vertically polarized waves image generated by the image generation unit 2.

In step S4, the polarization ratio storage unit 5 stores, for each radiation angle $\theta$, the polarization ratio $P_H/P_V$ calculated by the polarization ratio calculation unit 3.

In step S5, the refractive index calculation unit 6 calculates a ratio $\Gamma(\theta_0, \theta_1)$ of the polarization ratios $P_H/P_V$ with regard to the two radiation angles $\theta_0$ and $\theta_1$. In step S6, the refractive index calculation unit 6 then calculates a refractive index n of the object according to the calculated ratio $\Gamma(\theta_0, \theta_1)$ with reference to Fresnel equations. The refractive index calculation unit 6 may calculate the refractive index n at prescribed timing after the polarization ratio calculation unit 3 calculates the polarization ratios $P_H/P_V$.

In step S7, the road surface recognition unit 8 refers to refractive index information stored in the refractive index storage unit 7 and recognizes the condition of the road surface based on the refractive index n of the object calculated by the refractive index calculation unit 6.

The road surface condition detection device according to the embodiment of the present invention calculates the polarization ratio of the horizontally polarized waves to the vertically polarized waves of the radio waves radiated from the object and calculates the refractive index of the object based on the ratio of the polarization ratios of the two different radiation angles so as to detect the condition of the road surface with high accuracy.

In addition, the road surface condition detection device according to the embodiment of the present invention calculates the refractive index at prescribed timing after calculating the polarization ratios and uses some pieces of statistical time series information so as to calculate the refractive index with improved accuracy.

In the road surface condition detection device according to the embodiment of the present invention, the refractive index storage unit 7 stores the refractive index information including the items of the road surface conditions and recognizes the condition of the road surface while excluding particular items depending on an ambient temperature so as to reduce a risk of incorrect determination and detect the condition of the road surface with high accuracy.

In the road surface condition detection device according to the embodiment of the present invention, the road surface condition recognition unit 8 recognizes the condition of the road surface in the detected road surface region so as to reduce a risk of incorrect determination and detect the condition of the road surface with high accuracy.

In the road surface condition detection device according to the embodiment of the present invention, the road surface condition recognition unit 8 calculates the distance to the actual position corresponding to the boundary corresponding to the refractive index so as to preliminarily control the vehicle or provide a passenger with information.

Although the present invention has been described above by reference to the embodiment, the present invention should not be limited to the descriptions and the drawings composing part of the disclosure. It will be apparent to those skilled in the art that various alternative embodiments, examples and implementations can be made.

For example, in the embodiment described above, the road surface condition detection device may include two radio waves receiving units 1 aligned in the vertical direction for separately detecting horizontally polarized waves and vertically polarized waves so as to calculate polarization ratios $P_H/P_V$ of two radiation angles. The polarization ratios $P_H/P_V$ are calculated by use of the difference of elevation of the two radio waves receiving units 1 having different heights so as to detect the condition of the road surface with high accuracy even when the vehicle is being stopped. For example, the lower radio waves receiving unit 1 is arranged at a height in the range from 30 to 50 cm, and the difference of height of the upper and lower units is in the range from 30 to 50 cm. Alternatively, three radio waves receiving units 1 may be used to calculate polarization ratios $P_H/P_V$ so as to calculate a refractive index of an object other than the road surface.

In the embodiment described above, the polarization ratio calculation unit 3 may detect an inclination of a road surface where the vehicle is driving so as to correct a radiation angle θ according to the detected inclination of the road surface. The inclination of the road surface may be obtained by use of, for example, a GPS receiver and map data, a gyro sensor, or an acceleration sensor. Accordingly, the radiation angle θ can be corrected precisely even if the radiation angle necessary for calculating a refractive index n is incorrectly calculated so as to detect the condition of the road surface with high accuracy.

The present invention can, of course, include various embodiments not described in this specification. Therefore, the scope of the present invention is defined only by the appropriate features according to the claims in view of the explanations made above.

The present invention can provide a road surface condition detection device and a road surface condition detection method capable of detecting road surface conditions with high accuracy regardless of weather.

The invention claimed is:

1. A road surface condition detection device comprising:
a radio waves receiving unit configured to receive intensity of horizontally polarized waves and intensity of vertically polarized waves of radio waves radiated from a road surface region at a radiation angle;
a polarization ratio calculation unit configured to calculate, for each radiation angle, a polarization ratio which is a ratio of the intensity of the horizontally polarized waves and the intensity of the vertically polarized waves;
a refractive index calculation unit configured to calculate a refractive index of the road surface region according to a change between polarization ratios of two different radiation angles calculated by the polarization ratio calculation unit; and
a road surface condition recognition unit configured to recognize a condition of a road surface based on the refractive index calculated by the refractive index calculation unit.

2. The road surface condition detection device according to claim 1, wherein:
the road surface condition detection device is installed in a vehicle; and
the polarization ratio calculation unit calculates the polarization ratios of the two different radiation angles according to a change in travel distance.

3. The road surface condition detection device according to claim 1, comprising a first radio waves receiving unit and a second radio waves receiving unit aligned in a vertical direction, each of the first radio waves receiving unit and the second radio waves receiving unit corresponding to the radio waves receiving unit,
wherein the polarization ratio calculation unit calculates the polarization ratios of the two different radiation angles by use of a difference of elevation of the first radio waves receiving unit and the 4 second radio waves receiving unit.

4. The road surface condition detection device according to claim 1, wherein the refractive index calculation unit calculates the refractive index at prescribed timing after the polarization ratio calculation unit calculates the polarization ratios.

5. The road surface condition detection device according to claim 1, further comprising a refractive index storage unit configured to store refractive index information including items of road surface conditions in relation to refractive indexes,
wherein the road surface condition recognition unit recognizes the condition of the road surface based on the refractive index calculated by the refractive index calculation unit with reference to the refractive index information stored in the refractive index storage unit.

6. The road surface condition detection device according to claim 5, wherein the road surface condition recognition unit recognizes the condition of the road surface in such a manner as to exclude a prescribed item of the road surface conditions in the refractive index information depending on an ambient temperature.

7. The road surface condition detection device according to claim 1, wherein the road surface condition recognition unit determines a boundary corresponding to the refractive index calculated by the refractive index calculation unit in the images generated by the image generation unit so as to calculate a distance to an actual position corresponding to the boundary.

8. A road surface condition detection method comprising:
receiving intensity of horizontally polarized waves and intensity of vertically polarized waves of radio waves radiated from a road surface region at a radiation angle by a receiver;
calculating, for each radiation angle, a polarization ratio which is a ratio of the intensity of the horizontally polarized waves to the intensity of the vertically polarized waves based on the generated horizontally polarized waves image and vertically polarized waves image by a processor;

calculating a refractive index of the road surface region according to a change between calculated polarization ratios of two different radiation angles by the processor; and recognizing, with the processor, a condition of a road surface based on the calculated refractive index.

9. A road surface condition detection device comprising:

a radio waves receiving unit configured to receive intensity of horizontally polarized waves and intensity of vertically polarized waves of radio waves radiated from a road surface region at a radiation angle;

a polarization ratio calculation unit configured to calculate, for each radiation angle, a polarization ratio which is a ratio of the intensity of the horizontally polarized waves and the intensity of the vertically polarized waves;

a refractive index calculation unit configured to calculate a refractive index of the road surface region according to a change between polarization ratios of two different radiation angles calculated by the polarization ratio calculation unit; and a road surface condition recognition unit installed in a vehicle and configured to recognize a condition of a road surface based on the refractive index calculated by the refractive index calculation unit, wherein the polarization ratio calculation unit calculates the polarization ratios of the two different radiation angles according to a change in travel distance of the vehicle.

* * * * *